United States Patent [19]

Burke, III

[11] Patent Number: 5,529,142
[45] Date of Patent: Jun. 25, 1996

[54] VEHICLE THEFT PREVENTION DEVICE

[76] Inventor: John E. Burke, III, 134 Shady Brook, Centerville, Ohio 45459

[21] Appl. No.: 437,079

[22] Filed: May 5, 1995

[51] Int. Cl.⁶ .................................................. B60R 25/00
[52] U.S. Cl. ........................................... 180/287; 340/426
[58] Field of Search ........................ 180/287; 307/10.6; 340/426

[56] References Cited

U.S. PATENT DOCUMENTS

| | | | |
|---|---|---|---|
| 4,063,610 | 12/1977 | Shilling | 180/114 X |
| 4,074,672 | 2/1978 | LaDue et al. | 123/198 DC |
| 4,193,385 | 3/1980 | Katsumata et al. | 123/198 DC |
| 4,300,495 | 11/1981 | Trevino et al. | 123/198 B |
| 4,449,605 | 5/1984 | Read | 180/287 |
| 4,452,197 | 6/1984 | Weber | 123/198 B |
| 4,485,887 | 12/1984 | Morano | 180/287 |
| 4,762,198 | 8/1988 | Vagnone et al. | 180/287 |
| 4,866,296 | 9/1989 | Thomas | 307/141 |
| 4,914,314 | 4/1990 | Hirtz | 307/10.3 |
| 4,990,906 | 2/1991 | Kell et al. | 340/825.31 |
| 4,992,670 | 2/1991 | Pastor | 307/10.3 |
| 5,133,426 | 7/1992 | Niriella et al. | 180/287 |
| 5,180,924 | 1/1993 | Rudisel | 307/10.6 |
| 5,315,286 | 5/1994 | Nolan | 340/426 |
| 5,360,997 | 11/1994 | Watson | 307/10.1 |

*Primary Examiner*—Kenneth R. Rice
*Attorney, Agent, or Firm*—Tom Hamill, Jr.

[57] ABSTRACT

A vehicle theft prevention device which simply disables the engine control module (E.C.M) of a motor vehicle is disclosed. The device gives the user of the automobile the capacity to activate or deactivate the E.C.M. When the E.C.M. is deactivated the engine would crank but would not turn over, as the E.C.M. has been isolated form the electrical system. The device isolates the E.C.M. via the vehicle's fuse box. The device comprises a fuse box diverter which replaces the E.C.M fuse in the factory fuse box located in the interior of the vehicle. The fuse box diverter is connected to a switch by electrical wiring. Intermediate the switch and the fuse box diverter is a fuse element secured in an in-line fuse holder. By actuating the switch the circuit is disabled. The switch and the in-line fuse holder may be located at a remote location in the vehicle. The vehicle theft prevention device is very easy to install and requires no physical alterations to the existing vehicle electrical system. The vehicle theft prevention device is simply plugged into the vehicle's fuse box at an appropriate location. The switch is the secured at a remote and concealed location in the vehicle. Different configurations may be required for different vehicle types. A relay may be required to protect the switch and the in-line fuse holder from high loads.

14 Claims, 3 Drawing Sheets

VEHICLE THEFT PREVENTION DEVICE

BACKGROUND OF THE INVENTION

1. Field of the Invention

The present invention relates generally to devices for preventing the unauthorized use of a motor vehicle and more specifically to a device which isolates the engine control module or other suitable electrical subsystem of an automobile especially adapted to be easily installed by the vehicle owner.

2. Description of the Prior Art

This invention is used by automobile owners to prevent the unauthorized use of a vehicle. Vehicle theft is on the rise despite efforts of law enforcement authorities. Devices have been employed which disable various parts of the vehicle's electrical system in order to prevent the vehicle from being started. Prior art disclosures of such anti-theft devices suffer from three major deficiencies. First, the prior art devices are not designed to be utilized through the factory fuse box. Secondly, they are generally cumbersome, expensive and complex to install. Third, these unweildly prior art devices must be installed by an automotive expert as they modify substantially the existing vehicle's electrical system.

The instant invention solves these problem by providing a device which may be installed by anyone with even the most basic skills. This device is merely plugged into an existing fuse port in the factory fuse box after the removal of the existing fuse. There is no alteration of existing electrical system. The device includes a switch which may be attached at a remote and clandestine position. The switch may be of any variety with an on and off position. By actuating the switch, the E.C.M. module is isolated, and thus the vehicle is inoperable. If an unauthorized user of the vehicle attempts to start the vehicle with this simple system in place, the vehicle will turn over but will not start. It is believed the unauthorized user will not have the time to ascertain what is preventing the vehicle from starting and will cease efforts to illegally appropriate the vehicle. Other advantages of the present invention over the prior art will be rendered evident.

SUMMARY OF THE INVENTION

To achieve the foregoing and other advantages, the present invention, briefly described, provides a device which simply disables the engine control module (E.C.M) of a motor vehicle. The E.C.M. is essentially the "brain" of the vehicle and controls the engine functioning. The device gives the user of the automobile the capacity to activate or deactivate the E.C.M. When the E.C.M. is deactivated the engine would crank but would not turn over, as the E.C.M. has been isolated form the electrical system. The device isolates the E.C.M. via the vehicle's fuse box. The device comprises a fuse box diverter which replaces the E.C.M fuse in the factory fuse box located in the interior of the vehicle or under the hood of the vehicle. The fuse box diverter is connected to a switch by electrical wiring. Intermediate the switch and the fuse box diverter is a fuse element secured in an in-line fuse holder. By actuating the switch the circuit is disabled. The switch may be located at a remote location in the vehicle. Different configurations may be required for different vehicle types and will be shown as different embodiments. This device is merely plugged into an existing fuse port in the factory fuse box after the removal of the existing fuse. The existing fuse may be placed in the in-line fuse holder. A circuit is made between the factory fuse box, the fuse in the in-line fuse holder, and the simple on-off switch. By actuating the switch the circuit is disabled thus disabling the E.C.M. There is no alteration of existing electrical system. The device includes a switch which may be attached at a remote and clandestine position. The switch may be secured under the dashboard, in the glovebox or in another location. The switch may be of any variety with an on and off position. By actuating the switch, the E.C.M. module is isolated, and thus the vehicle is inoperable.

It is to be understood that the instant invention may be employed to disable other electrical subsystems of the vehicle which would also prevent the vehicle from be started or driven. These systems include the fuel pump, EFI or other systems. Some vehicles have what is termed a "learning ECM" which it would not be desirable to isolate. In this case, another electrical subsystem would be disabled utilizing the instant invention by plugging the fuse box diverter into the appropriate female fuse receptacle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention is to provide a new and improved vehicle theft prevention device which disables through electrical isolation the engine control module of an automobile.

It is another object of the present invention is to provide a new and improved vehicle theft prevention device which may be easily installed by being plugged into the factory fuse box located in the vehicle.

Still a further object of the present invention is to provide a new and improved vehicle theft prevention device which may be utilized on any vehicle which includes an engine control module, fuel pump fuse, or EFI fuse.

It is therefore an object of the present invention to provide a new and improved vehicle theft prevention device which has all of the advantages of the prior art and none of the disadvantages. These advantages include simplicity of installation, not altering the existing electrical system of the vehicle and minimal installation costs.

It is another object of the present invention to provide a new an improved vehicle theft prevention device which may be easily and efficiently manufactured and marketed.

It is a further objective of the present invention to provide a new and improved vehicle theft prevention device which is of durable and reliable construction.

An even further object of the present invention is to provide a new and improved vehicle theft prevention device which is susceptible of a low cost of manufacture with regard to both materials and labor, and which accordingly is then susceptible of low prices of sale to the consuming public, thereby making such a vehicle theft prevention device available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a new and improved vehicle theft prevention device embodying the principles and concepts of the present invention will be described.

Figure 1:
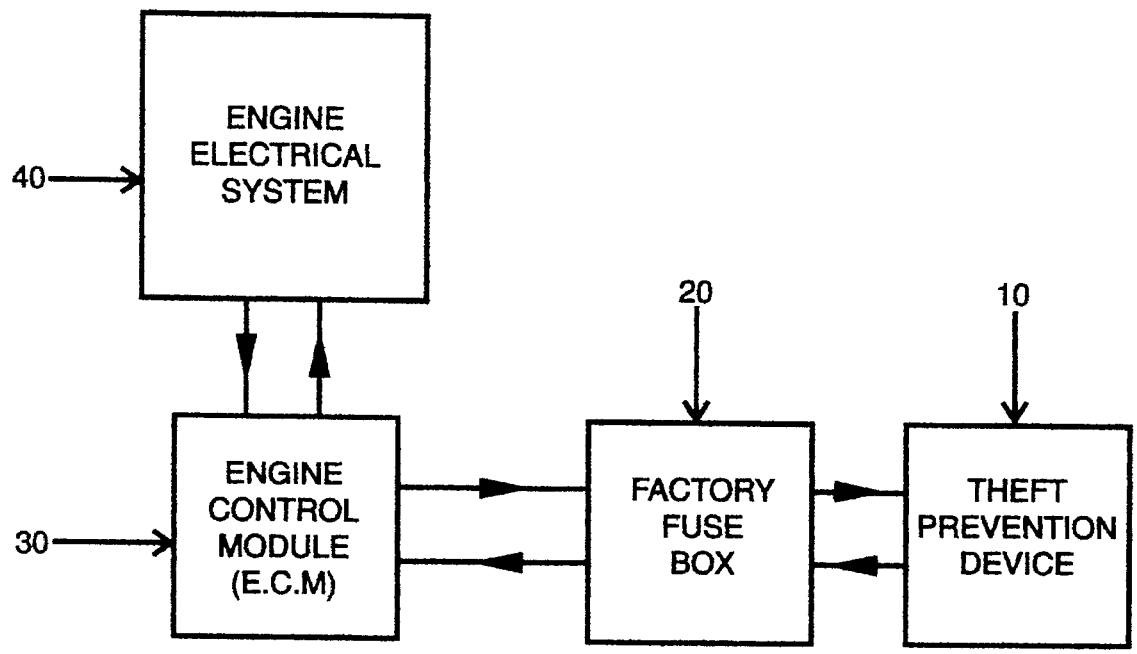
FIG. 1 is a block diagram showing the relationship of the engine control module to the engine electrical system and the vehicle theft prevention device.

Turning initially to FIG. 1 there is shown the vehicle theft prevention device implemented in a vehicular environment. The vehicle theft prevention device 10 is shown connected to the vehicle's fuse box 20. The vehicle's fuse box 20, in turn, is connected to the Engine Control Module (E.C.M.) 30. The E.C.M. 30 is connected to the engine electrical system 40, the engine electrical system 40 includes generally the ignition coil, the battery, the distributor as well as other electrical elements. By actuating the vehicle theft prevent device 10, the E.C.M 30 becomes disabled. The will prevent an unauthorized user of the vehicle in question from starting the vehicle. The vehicle will turn over; however it will not start.

Figure 2:
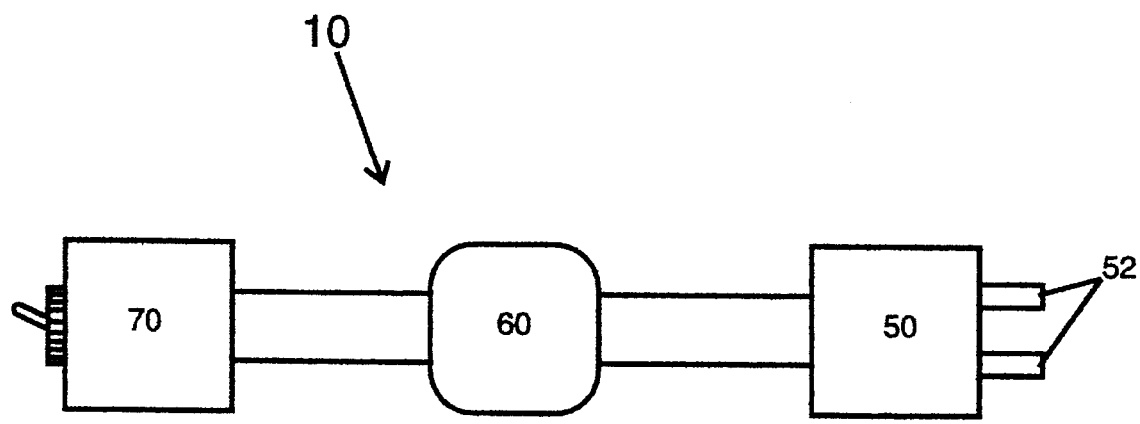
FIG. 2 is a schematic view of the vehicle theft prevention device.

Referring now specifically to FIG. 2, a first embodiment of the vehicle theft prevention device 10 is shown. The device 10 taps into the E.C.M. 30 via the vehicle's. fuse box 20, by removing the fuse which protects the E.C.M. 30 and inserting a fuse box diverter 50 to reroute the circuit through the device 10. The fuse box diverter 50 has fuse box connection means 52, connection means 52 further being described as prongs. It is to be understood that the connection means 52 is designed to mate with the vehicle fuse box 30 identically to the fuse which protects the E.C.M. 30. It is realized that different vehicles may have different prong configurations and it is to be clearly understood that different prong configurations may be provided on the device 10 to permit its use on different vehicles. The device 10 may be utilized on any vehicle modern enough to have an E.C.M 30 connected to the vehicle fuse box 20. The fuse box diverter 50 is then connected to an in-line fuse holder 60. The in-line fuse holer 60 is remote from the fuse box diverter 50 and is in electrical communication with fuse box diverter 50. The fuse that was removed from the vehicle's fuse box is placed in the in-line fuse holder 60. This permits the device 10 to afford the E.C.M. 30 with all the protection that just the fuse alone would offer. The E.C.M. 30 is protected from electrical surges while utilizing the device 10. The in-line fuse holder 60 is to be placed in a concealed position remote from the vehicle's fuse box 20. It may be secured under the dashboard or in another location. The in-line fuse holder 60 is connected to a switch 70. The in-line fuse holder 60 is in electrical communication with the switch 70. Switch 70 may be any type of switch with a discreet on/off position. A single pole, single throw switch may be utilized. Other switches, including rotating switches may be utilized. Switch 70, when actuated, disables the electrical circuit formed between the E.C.M. 30 and the fuse. Through engagement of the switch 70 the vehicles ability to start is disabled. Switch 70 should be placed at a remote location which is preferably concealed, yet accessible. Possible locations that the switch 70 may be located includes, but is not limited to, under the dash, the trunk, the glove box, under the hood, and under the seat.

Figure 3:
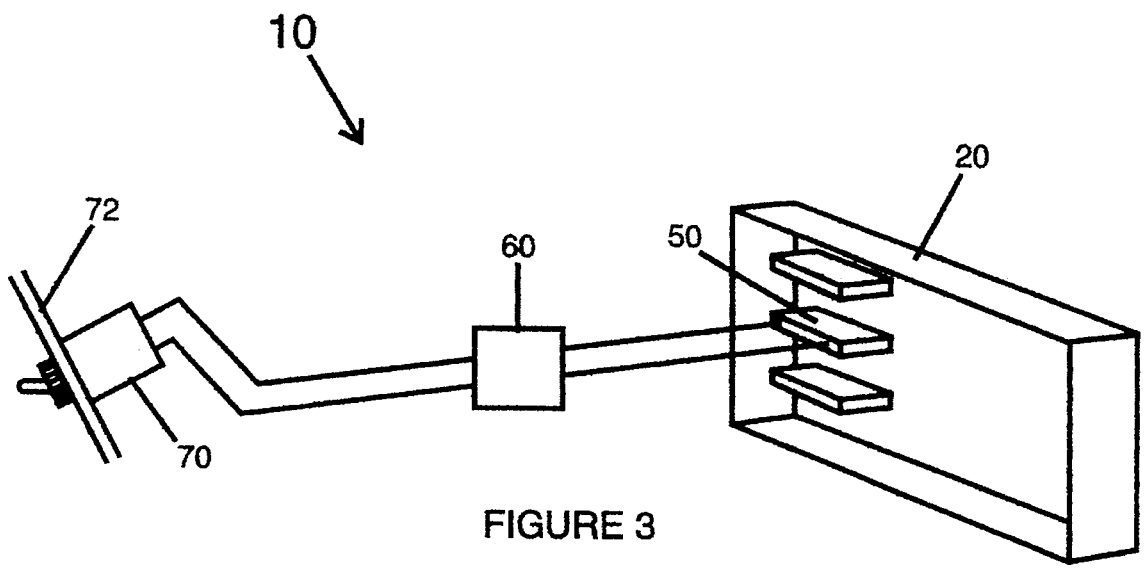
FIG. 3 is a view of the vehicle theft prevention device in its installed state.

Referring now specifically to FIG. 3 the device 10 is shown in its implemented configuration. Switch 70 is shown connected to dash 72. A first attachment means is provided for the switch 70 to permit switch 70 to be attached to a first concealed location. The in-line fuse holder 60 is shown at a general location intermediate the switch 70 and the fuse box diverter 50. A second attachment means is provided for the in-line fuse holder to permit the in-line fuse holder to be attached to a second concealed location. The fuse box diverter 50 is shown plugged in to the vehicle fuse box 20. Other fuses for other electrical subsystems in the vehicle are shown located in the vehicles fuse box 20.

Figure 4:
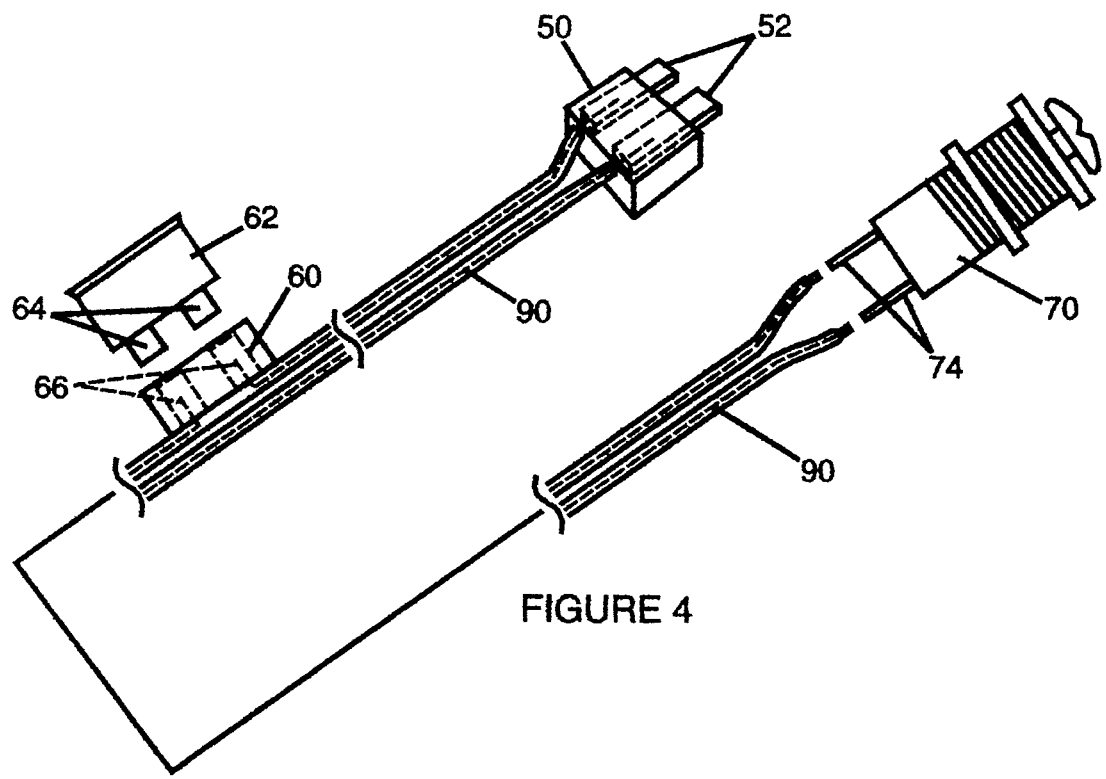
FIG. 4 is a top view of an embodiment of the instant invention.

Referring now specifically to FIG. 4, the device 10 is again shown. Fuse box diverter 50 with connection means 52 is shown connected to the in-line fuse holder 60 by wire 90. In-line fuse holder 60 has a female receiving means 66 designed to receive element 64 of fuse 62. Fuse 62 is the fuse removed from the vehicle's fuse box 20 or an identical fuse. Fuse 62 is in electrical communication with fuse box diverter 50. Switch 70 is shown connected to the in-line fuse holder 60 by wire 90. Switch 70 includes switch connection means 74.

Figure 5:
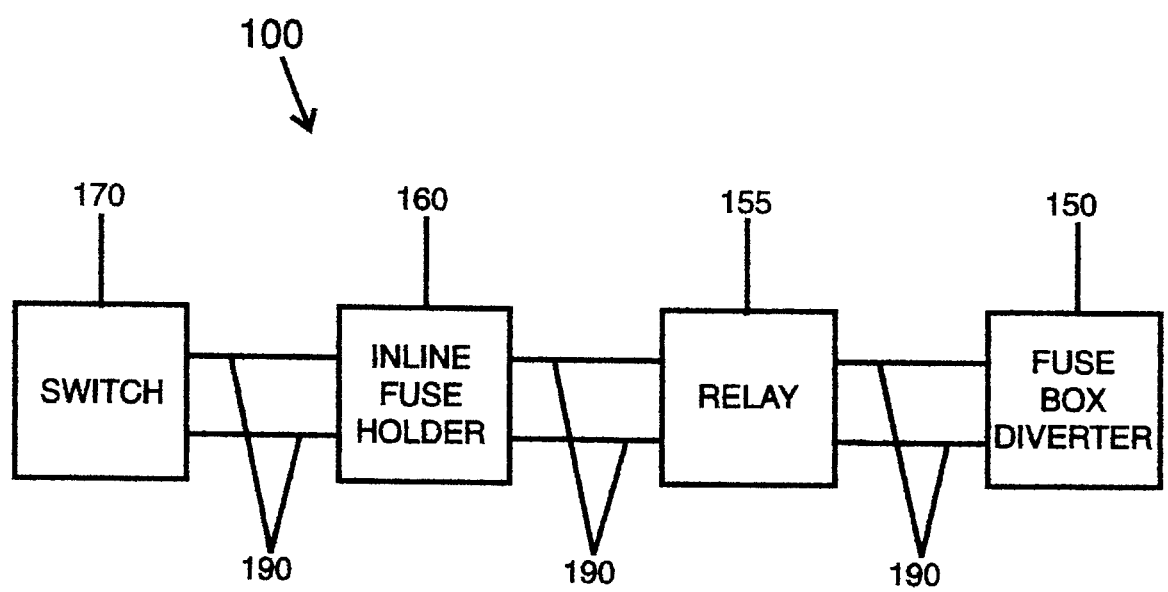
FIG. 5 is a block diagram of the second embodiment of the instant invention including the relay means.

FIG. 5 shows a block diagram of the second embodiment of the instant invention generally designated 100. A fuse box diverter 150 is provided which is connected to relay 155. Relay 155 is then connected to the in-line fuse holder 160. The in-line fuse holder 160 is then connected to the switch 170. Since the switch 170, the wire 190 and the fuse box diverter 150 must be able to maintain the maximum amperage which the circuit was originally designed to maintain, a relay means 155 may provided in order to decrease the load on the switch 70. Relay 155 may be provided with a third attachment means to permit relay 155 to be secured to a third location. The relay means 155 will be included when deemed necessary such as the case when a high load circuit is disabled, or to protect the circuit from a power surge or a power spike.

It is apparent from the above that the present invention accomplishes all of the objectives set forth by providing a new and improved vehicle theft prevention device which disables through electrical isolation the engine control module of an automobile which may be easily installed through the factory fuse box.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

I claim:

1. A vehicle theft prevention device which isolates an electrical subsystem of a vehicle such as the engine control module through the vehicle's fuse box, preventing the unauthorized use of the vehicle, comprising:

a fuse box diverter, said fuse box diverter including a first connection means, an in-line fuse holder, said in line fuse holder in communication with said fuse box diverter, said in-line fuse holder including a fuse receiving means, a fuse, said fuse located in said fuse receiving means, said fuse in communication with said fuse box diverter, a switch, said switch in communication with said in-line fuse holder, said switch further including an on position and an off position, whereby said fuse box diverter is connected to the vehicle's fuse box in a predetermined location by said first connection means, and by placing said switch in said off position, the electrical subsystem of a vehicle, such as the engine control module is disabled, preventing the unauthorized use of the vehicle.

2. The vehicle theft prevention device of claim 1 wherein said switch is located in a first concealed position remote from the vehicle's fuse box.

3. The vehicle theft prevention device of claim 2 wherein said in-line fuse holder is located at a second concealed position remote from the vehicle's fuse box.

4. The vehicle theft prevention device of claim 3 including a relay means, said relay means located intermediate said in-line fuse holder and said fuse box diverter.

5. The vehicle theft prevention device of claim 4 wherein said relay means is in communication with said in-line fuse holder and said fuse box diverter.

6. The vehicle theft prevention device of claim 5 wherein said first connection means includes prongs.

7. The vehicle theft prevention device of claim 2 wherein said switch includes a first attachment means for securing to said first concealed location.

8. The vehicle theft prevention device of claim 3 wherein said in-line fuse holder includes a second attachment means for securing to said second concealed position.

9. A vehicle theft prevention device which isolates an electrical subsystem of a vehicle, such as the engine control module, through the vehicle's fuse box preventing the unauthorized use of the vehicle, comprising:

a fuse box diverter, said fuse box diverter including a first connection means, a relay means, said relay means in communication with said fuse box diverter, an in-line fuse holder, said in line fuse holder in communication with said relay means, said in-line fuse holder including a fuse receiving means, a fuse, said fuse located in said fuse receiving means, said fuse in communication with said fuse box diverter, a switch, said switch in communication with said in-line fuse holder, said switch further including an on position and an off position, whereby said fuse box diverter is connected to the vehicle's fuse box in a predetermined location by said first connection means, and by placing said switch in said off position, the electrical subsystem of the vehicle is disabled, preventing the unauthorized use of the vehicle.

10. The vehicle theft prevention device of claim 9 wherein said switch is located in a first concealed position remote from the vehicle's fuse box.

11. The vehicle theft prevention device of claim 10 wherein said in-line fuse holder is located at a second concealed position remote from the vehicle's fuse box.

12. The vehicle theft prevention device of claim 10 wherein said switch includes a first attachment means for securing to said first concealed location.

13. The vehicle theft prevention device of claim 11 wherein said in-line fuse holder includes a second attachment means for securing to said second concealed position.

14. The vehicle theft prevention device of claim 9 wherein said first connection means includes prongs.

* * * * *